(12) United States Patent  (10) Patent No.: US 7,421,721 B2
An  (45) Date of Patent: Sep. 2, 2008

(54) PICKUP GUIDING STRUCTURE FOR OPTICAL DISK DRIVE

(75) Inventor: Yong-Mo An, Seoul (KR)

(73) Assignee: LG Electronics Inc., Seoul (KR)

( * ) Notice: Subject to any disclaimer, the term of this patent is extended or adjusted under 35 U.S.C. 154(b) by 555 days.

(21) Appl. No.: 11/120,204

(22) Filed: May 3, 2005

(65) Prior Publication Data

US 2005/0249057 A1 Nov. 10, 2005

(30) Foreign Application Priority Data

May 4, 2004 (KR) .................. 10-2004-0031538

(51) Int. Cl.
*G11B 7/08* (2006.01)
(52) U.S. Cl. .................. 720/677; 720/675; 720/676; 369/44.14
(58) Field of Classification Search .......... 720/675, 720/676, 677
See application file for complete search history.

(56) References Cited

U.S. PATENT DOCUMENTS

| | | | | |
|---|---|---|---|---|
| 6,249,495 | B1 * | 6/2001 | Okada et al. | 369/44.28 |
| 2003/0133397 | A1 * | 7/2003 | Nagatsuka | 369/223 |
| 2003/0179682 | A1 * | 9/2003 | Osada et al. | 369/112.23 |
| 2004/0205795 | A1 * | 10/2004 | Choi | 720/679 |

* cited by examiner

*Primary Examiner*—Thang V. Tran
*Assistant Examiner*—Lixi Chow
(74) *Attorney, Agent, or Firm*—Ked & Associates, LLP (57) ABSTRACT

An optical pickup guiding structure for an optical disk drive is provided. The optical pickup guiding structure comprises a pickup base with a pickup window formed therein, and an optical pickup that is provided in the pickup window and that includes at least one end movably supported by a molded structure integrally formed on the pickup base. The end of the optical pickup and a molded structure for movably supporting the end of the optical pickup are formed with a guide channel and a guide rib, respectively, which are complementary to each other, thereby guiding the optical pickup. Because the number of parts of the optical disk chive is minimized, and the change in the installation state of the optical pickup is minimized during use, the operational reliability is improved.

9 Claims, 6 Drawing Sheets

PICKUP GUIDING STRUCTURE FOR OPTICAL DISK DRIVE

BACKGROUND OF THE INVENTION

1. Field of Invention

The present invention relates to an optical disk drive, and more particularly, to an optical pickup guiding structure for guiding an optical pickup for reading and writing signals from and to an optical disk.

2. Description of the Prior Art

Figure 1:
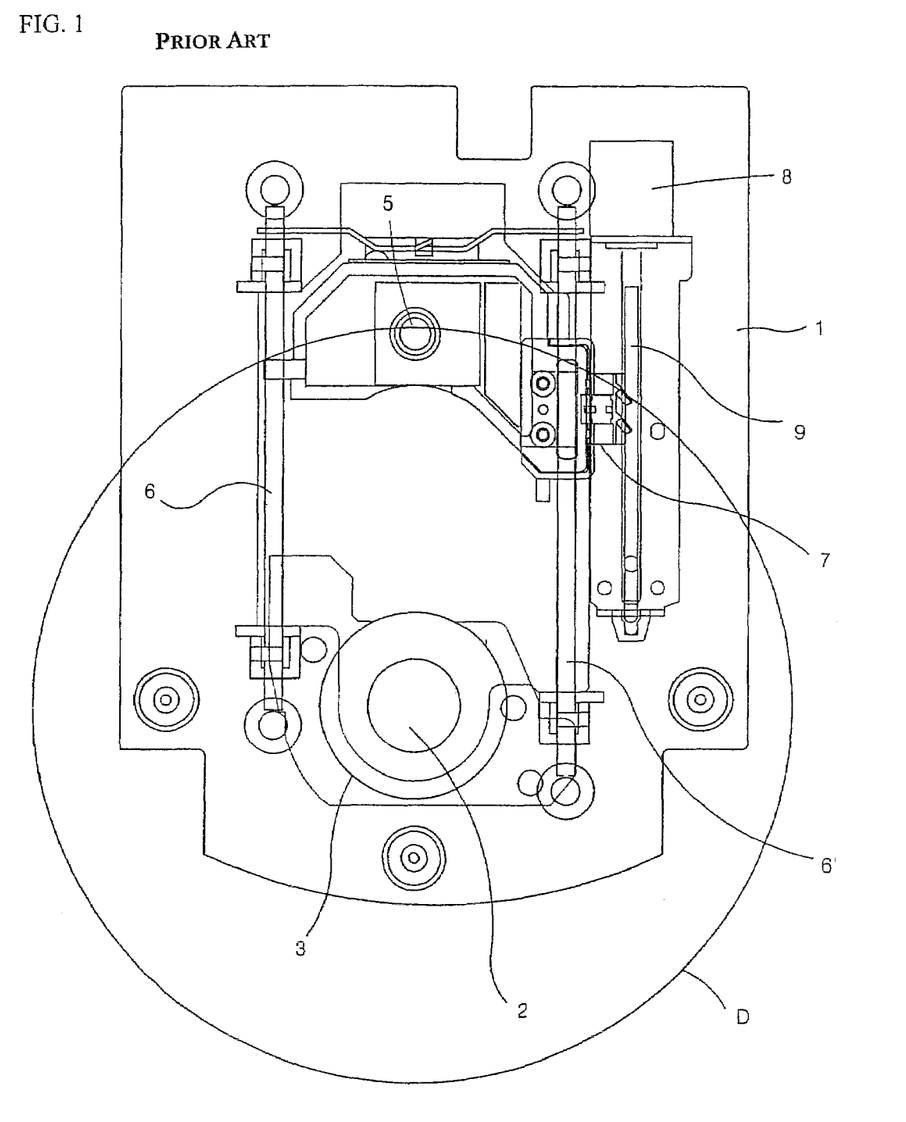
FIG. 1 is a plan view showing a general optical disk drive.

FIG. 1 is a plan view showing a general optical disk drive. As shown in the figure, a pickup base 1 installed on a main chassis (not shown) is mounted with a spindle motor 2 for rotating a disk D, and the spindle motor 2 is mounted with a turntable 3 on which the disk D is seated.

An optical pickup 5 for writing a signal to a signal recording surface of the disk D or reading the recorded signal from the disk is supported on a pair of guide shafts 6 and 6', which are installed on the pickup base 1 to be parallel with each other, so that the optical pickup 5 is movable in the radial direction of the disk D. The optical pickup 5 is mounted with a feed guide 7 at a side thereof. The feed guide 7 is guided along a lead screw 9, which is rotated by means of a sled motor 8 installed on the pickup base 1, so that the optical pickup 5 can be moved along the pickup guide shafts 6 and 6'.

However, the aforementioned prior art has the following problems.

In the prior art, both ends of the optical pickup 5 are movably supported using the guide shafts 6 and 6' supported on the pickup base 1. Since the respective guide shafts 6 and 6' are separately manufactured and installed on the pickup base 1, there are problems in that the total number of parts of the optical disk drive is increased and an assembly process thereof is complicated.

Particularly, as the number of parts of the optical disk drive according to the prior art is relatively large, the defect rates due to the assembly tolerance are increased. There are also problems in that the installation state of the guide shafts 6 and 6' is changed by an external force during use, and thus, the operational reliability thereof is deteriorated.

SUMMARY OF THE INVENTION

Accordingly, the present invention is conceived to solve the aforementioned problems in the prior art. An object of the present invention is to provide an optical pickup guiding structure for an optical disk drive of which parts are relatively decreased in number.

Another object of the present invention is to provide an optical pickup guiding structure for an optical disk drive, wherein the assembly tolerance is minimized and the assembly state is changed relatively less during use.

According to an aspect of the present invention for achieving the objects, there is provided an optical pickup guiding structure for an optical disk drive, comprising: a pickup base with a pickup window formed therein; and an optical pickup provided in the pickup window and having at least one end movably supported by a molded structure integrally formed on the pickup base, wherein the end of the optical pickup and the molded structure movably supporting the end of the optical pickup are formed with a guide channel and a guide rib, respectively, which are complementary to each other, thereby guiding the optical pickup.

Preferably, an end of a pickup body of the optical pickup is formed with a first support portion that is movably supported by a first molded guide portion formed on the pickup base, and the other end of the pickup body is provided with a second support portion through which a guide shaft of a second guide portion provided on the pickup base pass and which movably supports the pickup body.

More preferably, the first support portion in contact with the first guide portion is formed to be wider than the second support portion in contact with the second guide portion.

More preferably, at least one end of the molded guide portion is provided with an elastically deformable stopper, thereby preventing the optical pickup from being inadvertently detached from the pickup base.

More preferably, an end of a pickup body of the optical pickup is formed with a first support portion that is movably supported by a first guide portion including a guide shaft provided on the pickup base, and the other end of the pickup body is formed with a second support portion that is movably supported by a second molded guide portion formed on the pickup base.

More preferably, the first support portion in contact with the first guide portion is formed to be wider than the second support portion in contact with the second guide portion.

More preferably, at least one end of the molded guide portion is provided with an elastically deformable stopper, thereby preventing the optical pickup from being inadvertently detached from the pickup base.

More preferably, both ends of a pickup body of the optical pickup are provided with first and second support portions, and first and second molded guide portions for supporting the first and second support portions are provided along both ends of the pickup window of the pickup base.

More preferably, the first support portion in contact with the first guide portion is formed to be wider than the second support portion in contact with the second guide portion.

More preferably, the first support portion includes first and second support legs which are different from each other in their levels, and the first guide portion corresponding to the first support portion includes first and second guide legs which are different from each other in their levels in such a manner that the guide legs correspond to the support legs, respectively.

More preferably, at least one end of the molded guide portion is provided with an elastically deformable stopper, thereby preventing the optical pickup from being inadvertently detached from the pickup base.

According to other aspect of the present invention for achieving the objects, there is provided an optical pickup guiding structure, comprising: a pickup base including a spindle motor for rotating a disk and an optical pickup for writing and reading a signal to and from the disk, wherein at least one of both ends of the optical pickup is movably supported in a molded guide portion integrally formed on the pickup base.

According to the present invention so configured, there are advantages in that the number of parts of the optical disk drive is minimized, and the change in the installation state of the optical pickup is minimized during use, so that the operational reliability is improved.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE PREFERRED EMBODIMENT

Hereinafter, preferred embodiments of an optical pickup guiding structure of an optical disk drive according to the present invention will be described in detail with reference to the accompanying drawings.

Figure 2:
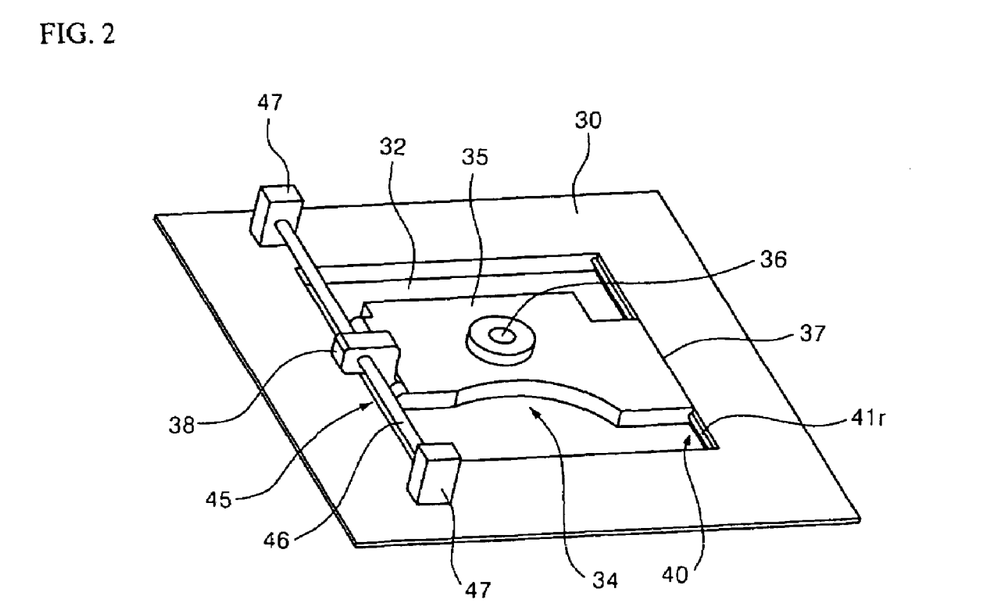
FIG. 2 is a schematic perspective view showing a preferred embodiment of an optical pickup guiding structure according to the present invention.
Figure 3:
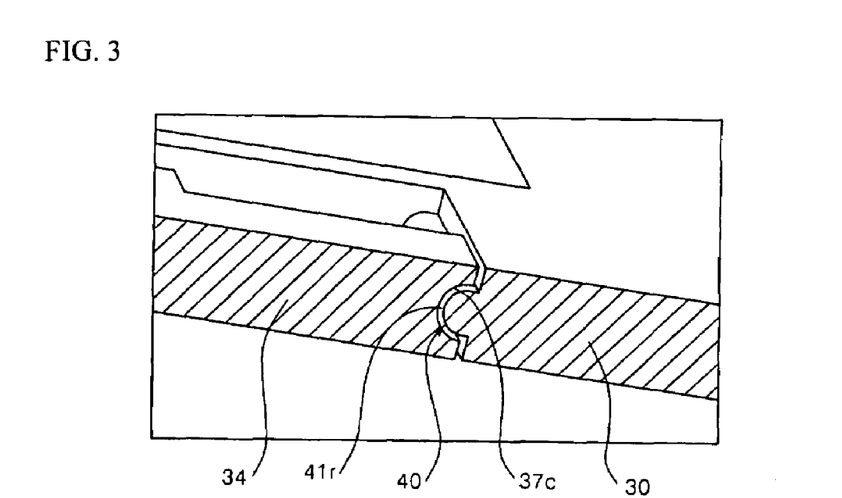
FIG. 3 is a partially sectional perspective view showing the major configuration of the embodiment shown in FIG. 2.

FIG. 2 is a schematic perspective view showing a preferred embodiment of the optical pickup guiding structure according to the present invention, and FIG. 3 is a sectional perspective view showing the major configuration of the embodiment shown in FIG. 2.

Referring to the figures, in the present embodiment, a pickup base 30 is installed on a main chassis (not shown) of the optical disk drive. The pickup base 30 is mounted with a spindle motor for rotating a disk, an optical pickup 34 for writing a signal on the disk and reading a recorded signal from the disk, and the like.

It is preferred that the pickup base 30 be formed of metallic material. In particular, some parts made of synthetic resin may be integrally formed on a portion of the pickup base 30 by insert molding. A pickup window 32 of a predetermined shape is bored vertically through the pickup base 30. The pickup window 32 is formed to occupy a predetermined area in the pickup base 30.

The optical pickup 34 is movably positioned in the pickup window 32. The optical pickup 34 serves to write and read a signal to and from a signal recording surface of the disk. The optical pickup 34 includes a molded pickup body 35. The pickup body 35 has such a size and shape that the pickup body 35 can be positioned in the pickup window 32. Reference numeral 36 designates a pickup lens for irradiating light to the optical disk and receiving light reflected from the disk.

First and second support portions 37 and 38 are provided on both ends of the pickup body 35, respectively. The first and second support portions 37 and 38 cause the optical pickup 34 to be movably supported in the pickup window 32. Here, the first support portion 37 is formed to be wider than the second support portion 38. That is, the pickup body 35 is supported on the pickup base 30 in a relatively wider section, so that the installation state of the pickup body 35 is prevented from being distorted in a direction in which light is irradiated from the pickup lens 36.

The first support portion 37 is formed with a guide channel 37c. The guide channel 37c is inwardly recessed and formed to straightly extend in the moving direction of the optical pickup 34.

The second support portion 38 protrudes upward from the other portions of the pickup body 35 and extends a predetermined length in the opposite direction of the first support portion 37 such that the second support portion 38 can be supported on a guide shaft 46 to be described later which is provided on an upper surface of the pickup base 30.

A first guide portion 40 is provided along one side of the pickup window 32, i.e. in the moving direction of the optical pickup 34. In the present embodiment, the first guide portion 40 includes a guide rib 41r having such a shape that it can be accommodated in the guide channel 37c. While the cross section of the guide rib 41r is a semicircular as shown in FIG. 3, the cross section of the guide channel 37c in which the guide rib 41r is seated is in the form of a semicircular groove corresponding to the guide rib 41r.

Here, it is preferred that the first guide portion 40 be formed into a molded structure. To this end, the first guide portion 40 is integrally formed on an inside edge of the pickup window 32 of the pickup base 30 by insert molding.

Next, a second guide portion 45, which movably supports the second support portion 38, will be described. The second guide portion 45 includes a guide shaft 46, which passes through and movably supports the second support portion 38, and supports 47 which support both ends of the guide shaft 46 on the pickup base 30. The guide shaft 46 is installed to extend along a side edge of the pickup window 32. The supports 47 support the guide shaft 46 on the pickup base 30 at a predetermined height.

In the meantime, although it is not illustrated in the figures in connection with the present embodiment, power needed to move the optical pickup 34 may be transferred through a feed guide provided in a side of the pickup body 35. It is preferred that the feed guide protrude from the first support portion 37 side. A structure for transferring power to the feed guide is provided on the upper surface of the pickup base 30 corresponding to the first support portion 37. As an example of such a structure, a gear train or a lead screw and a rack gear for transferring power from a sled motor is used.

Figure 4:
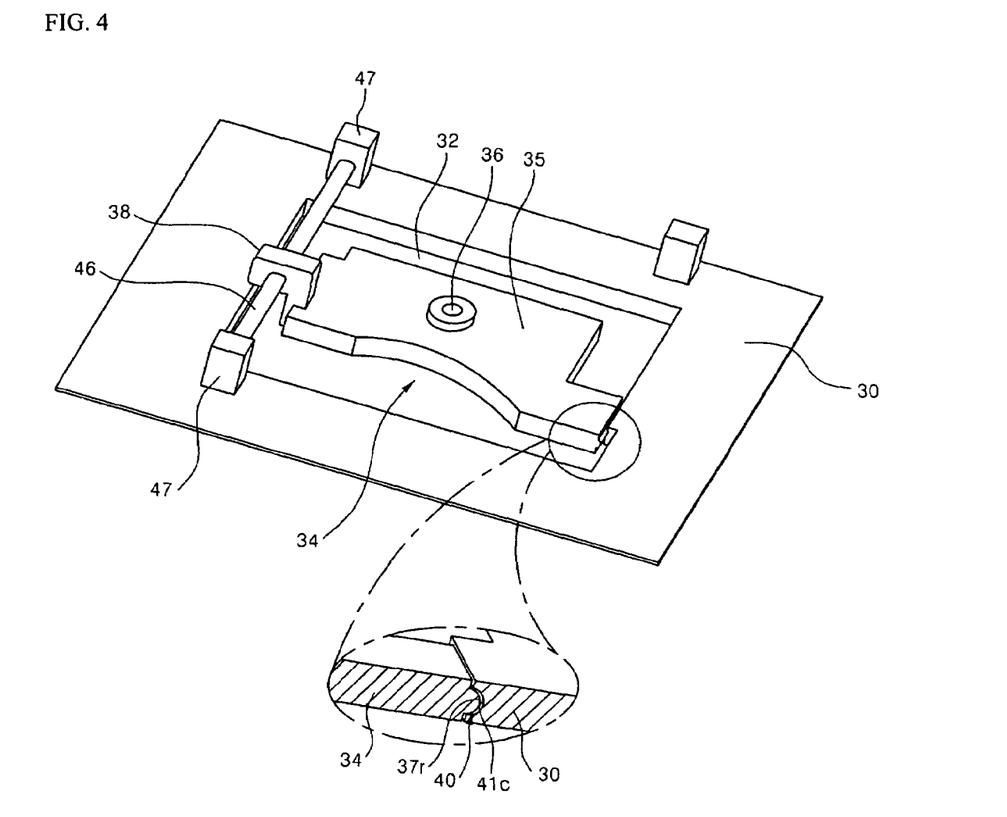
FIG. 4 is a schematic perspective view showing a modification of the embodiment shown in FIG. 2.

FIG. 4 shows a modification of the embodiment shown in FIG. 2. For convenience of description, only portions different from those of the previous embodiment will be described. In this modified embodiment, a first support portion 37 provided at an end of a pickup body 35 and a first guide portion 40 of a pickup base 30 complementary to the first support portion are formed in a reverse way to those in the embodiment shown in FIG. 2. That is, the first support portion 37 is formed with a guide rib 37r that protrudes outward and extends in the moving direction of the pickup body 35. A cross section of the guide rib 37r is semicircular.

In addition, the first guide portion 40 is formed with a guide channel 41c on which the guide rib 37r is movably seated. The guide channel 41c is formed to extend along one side of the pickup window 32 in the moving direction of the pickup body 35. A cross section of the guide channel 41c is also semicircular.

Figure 5:
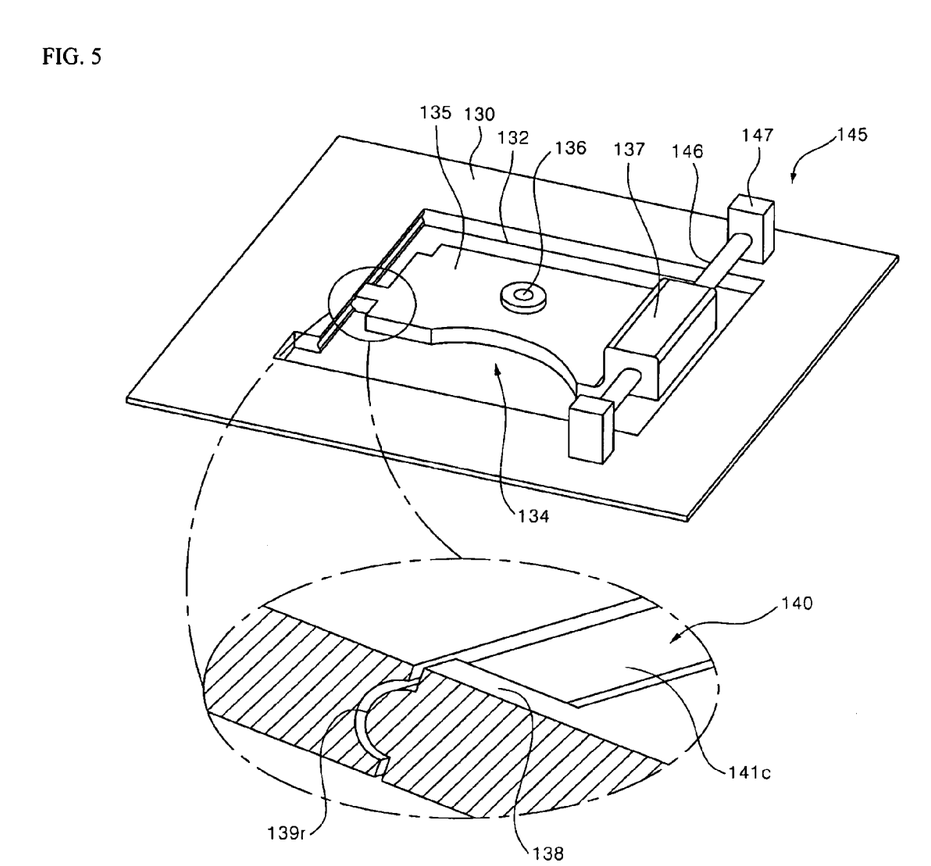
FIG. 5 is a schematic perspective view showing another embodiment according to the present invention.

Next, FIG. 5 shows another embodiment of the present invention. In this embodiment, reference numerals increased by one hundred are used to designate the elements corresponding to those of the previous embodiment.

As shown in the figure, a pickup base 130 of this embodiment is formed with a pickup window 132 in which an optical pickup 134 is movably installed. First and second support portions 137 and 138 are provided on both ends of a pickup body 135 of the optical pickup 134, respectively. The first and second supports 137 and 138 cause the optical pickup 134 to be movably supported in the pickup window 132.

Here, the first support portion 137 is formed to be wider than the second support portion 138. That is, the pickup body 135 is supported on the pickup base 130 in a relatively wider section, so that the installation state of the pickup body 135 is prevented from being distorted in a direction in which light is irradiated from a pickup lens 136.

The first support portion 137 protrudes relatively more than the other portions of the pickup body 135. The reason is that the first support portion 137 is movably supported on a guide shaft 146 installed on an upper surface of the pickup base 130 at a predetermined height.

The second support portion 138 is supported by the pickup base 130 in a section narrower than that of the first support portion 137. A leading end of the second support portion 138 is formed with a guide rib 139r. A cross section of the guide rib 139r is semicircular.

A second guide portion 140 is provided along one side of the pickup window 132, i.e. in the moving direction of the optical pickup 134. In this embodiment, the second guide portion 140 includes a guide channel 141c having such a shape that the guide rib 139r can be accommodated therein. The second guide portion 140 serves to movably support the second support portion 138 of the optical pickup 134.

As shown in an enlarged view of FIG. 5, a cross section of the guide channel 141c is semicircular. It is preferred that the second guide portion 140 be formed into a molded structure. To this end, the second guide portion 140 is integrally formed on an inside edge of the pickup window 132 of the pickup base 130 by insert molding.

Then, a first guide portion 145, which movably supports the first support portion 137, will be described. The first guide portion 145 includes the guide shaft 146, which passes through and movably supports the first support portion 137, and supports 147 which support both ends of the guide shaft 146 over the pickup base 130. The guide shaft 146 is installed to extend along a side edge of the pickup window 132. The supports 147 support the guide shaft 146 on the pickup base 130 at a predetermined height.

Figure 6:
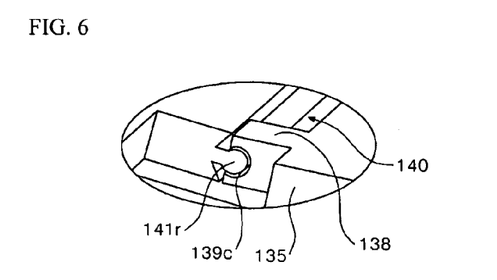
FIG. 6 is a perspective view showing a modification of the embodiment shown in FIG. 5.

Next, FIG. 6 shows a slight modification of the embodiment shown in FIG. 5, in which the same reference numerals are given to the elements corresponding to those of the embodiment shown in FIG. 5.

In this modified embodiment, a second support portion 138 of an optical pickup 134 is formed with a guide channel 139c. A second guide portion 140, which is inserted into the guide channel 139c and movably supports the optical pickup 134, is formed with a guide rib 141r. The guide rib 141r extends in the moving direction of the optical pickup 134.

In this embodiment, cross sections of the guide channel 139c and guide rib 141r are almost circular. That is, although the cross sections of the guide channels and guide ribs in the previous embodiments are semicircular, the contact area between the guide channel 139c and the guide rib 141r in this embodiment is increased to secure their engagement state.

Figure 7:
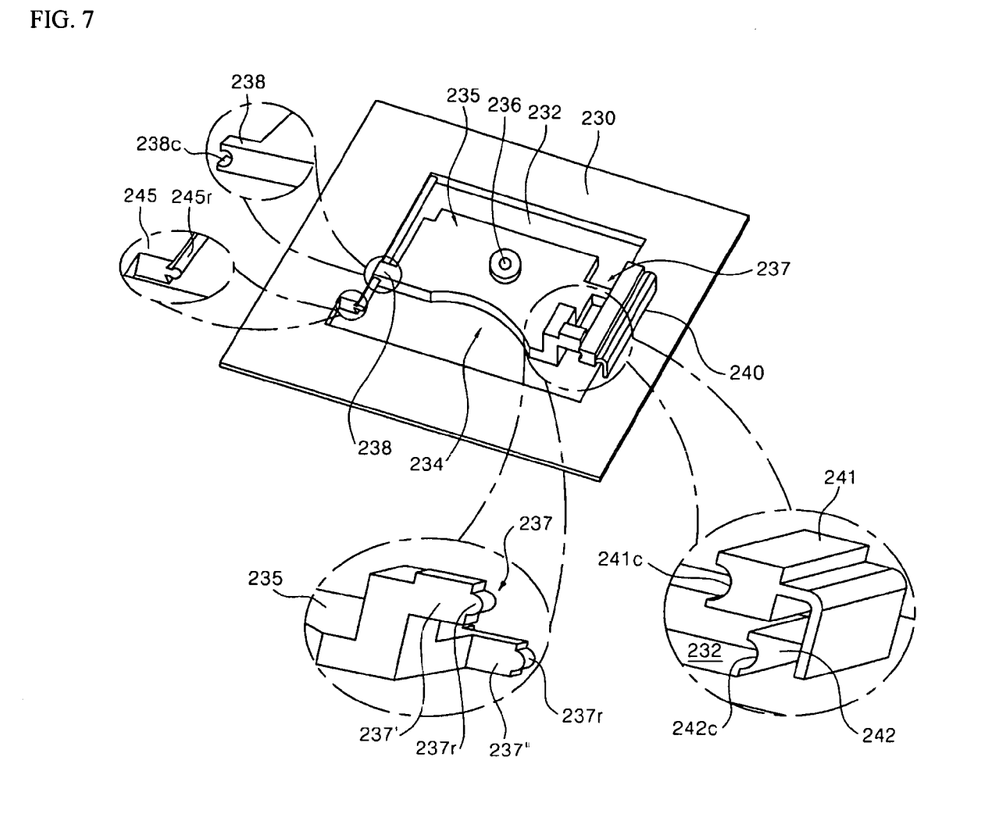
FIG. 7 is a schematic perspective view showing a further embodiment according to the present invention.
Figure 8:
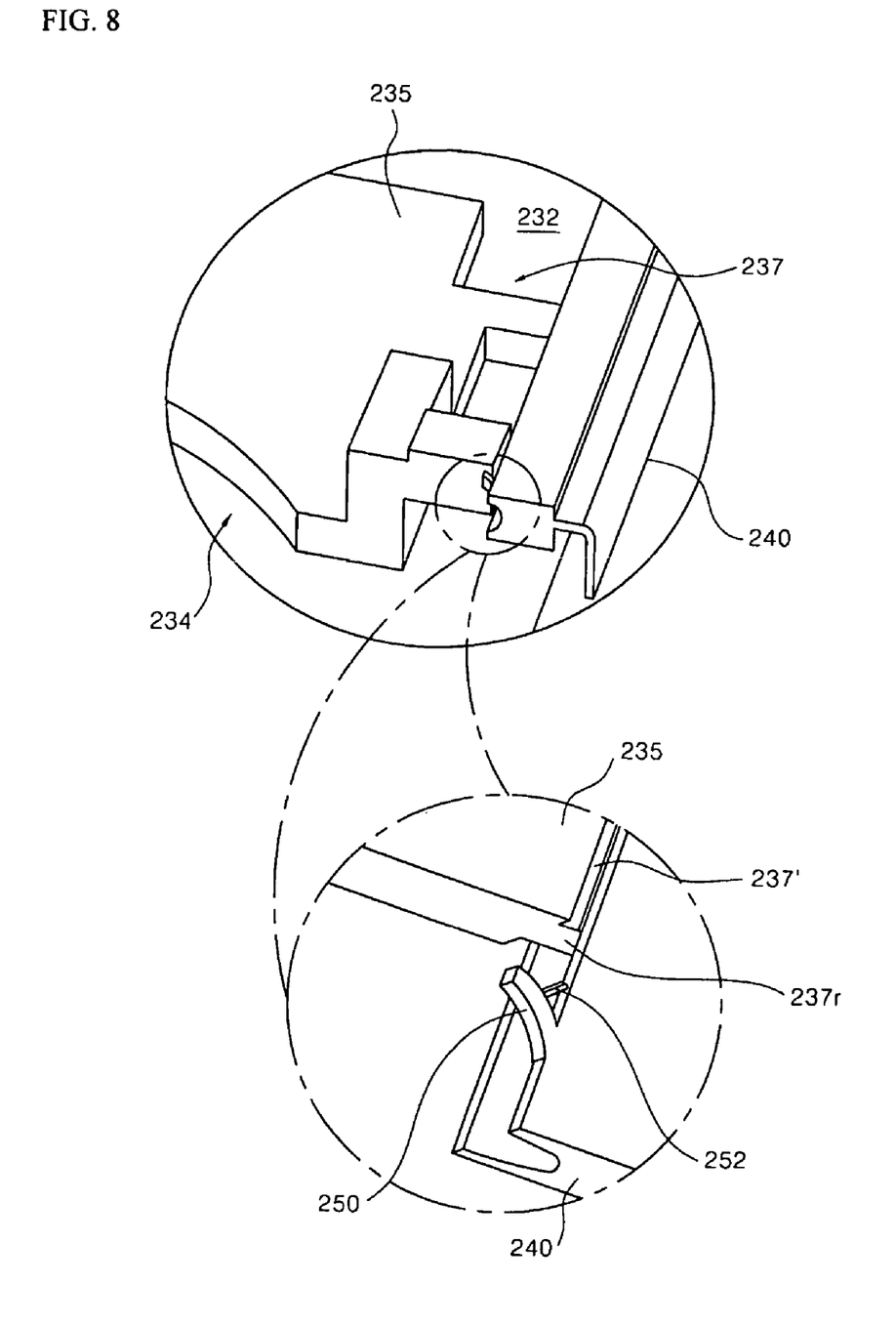
FIG. 8 is a perspective view showing the major configuration for preventing an optical pickup from being detached from a pickup base in the embodiments of the present invention.

FIGS. 7 and 8 show a further embodiment according to the present invention. Referring to the figures, a pickup base 230 is installed on a main chassis (not shown) of the optical disk drive. The pickup base 230 is mounted with a spindle motor for rotating a disk, an optical pickup 234 for writing a signal to the disk and reading the recorded signal from the disk, and the like.

It is preferred that the pickup base 230 be formed of metallic material. In particular, some parts made of synthetic resin may be integrally formed on a portion of the pickup base 230 by insert molding. A pickup window 232 of a predetermined shape is bored vertically through the pickup base 230. The pickup window 232 is formed to occupy a predetermined area in the pickup base 230.

The optical pickup 234 is movably positioned in the pickup window 232. The optical pickup 234 includes a molded pickup body 235 that defines a major external appearance of the optical pickup. Reference numeral 236 designates a pickup lens for irradiating light to the optical disk and receiving light reflected from the disk.

First and second support portions 237 and 238 are provided on both ends of the pickup body 235, respectively. The first and second support portions 237 and 238 cause the optical pickup 234 to be movably supported in the pickup window 232. The first support portion 237 is formed to be wider than the second support portion 238. That is, the pickup body 235 is supported on the pickup base 230 in a relatively wider section, so that the installation state of the pickup body 235 is prevented from being distorted in a direction in which light is irradiated from the pickup lens 236.

The first support portion 237 is provided with a plurality of support legs 237' and 237". The first and second support legs 237' and 237" are formed at the different levels from each other. That is, in this embodiment, the first support leg 237' is formed to be relatively higher than the second support leg 237". A guide rib 237r protrudes from each of the first and second support legs 237' and 237". A cross section of the guide ribs 237r is semicircular.

The second support portion 238 is supported by the pickup base 230 in a section narrower than that of the first support portion 237. A leading end of the second support portion 238 is formed with a guide channel 238c. A cross section of the guide channel 238c is at least semicircular.

A first guide portion 240 is provided along one side of the pickup window 232, i.e. in the moving direction of the optical pickup 234. In this embodiment, the first guide portion 240 includes two guide legs 241 and 242 that correspond to the first and second support legs 237' and 237" of the first support portion 237, respectively. The guide legs 241 and 242 are different from each other in their levels in such a manner that they correspond to the support legs 237' and 237", respectively. The guide legs 241 and 242 are provided with guide channels 241c and 242c, respectively, in which the guide ribs 237r formed on the support legs 237' and 237" are movably seated. Cross sections of the guide channels 241c and 242c are at least semicircular.

Here, it is preferred that the first guide portion 240 be formed into a molded structure. When the pickup base 230 is made of metal, the first guide portion 240 may be formed integrally on the pickup base 230, for example, by insert molding.

Next, the pickup base 230 is provided with a second guide portion 245 movably supporting the second support portion 238. The second guide portion 245 is formed with a guide rib 245r inserted in the guide channel 238c of the second support portion 238. It is preferred that the second guide portion 245 formed with the guide rib 245r be formed into a molded structure. To this end, the second guide portion 245 may be formed on the pickup base 230 by insert molding.

In the meantime, although it is not shown in the accompanying drawings, there is provided a still further embodiment of the present invention which is almost the same as the embodiment shown in FIG. 7 except that the guide ribs 237r and 245r and the guide channels 241c, 242c and 238c are formed at reverse positions to each other.

Next, FIG. 8 shows the configuration of a stopper for preventing the optical pickup from being detached from the pickup base and absorbing impact caused from the rapid movement of the optical pickup in the embodiments of the present invention. The stopper can be applied to all of the aforementioned embodiments but will be merely explained with reference to the embodiment shown in FIG. 7.

Elastic stoppers 250 shown in FIG. 8 may be provided on both ends of each of the first and second guide portions 240 and 245 formed on the pickup base 230. The elastic stoppers 250 can be elastically deformed by an external force, e.g. collision of the optical pickup 234 against the stopper. Even when the optical pickup 234 is assembled, the elastic stoppers 250 are also elastically deformed and then restored after the optical pickup 234 has been completely inserted into the pickup window 232.

Each of the elastic stoppers 250 can further include an auxiliary leg 252, which serves to support the elastic stopper 250. The auxiliary leg 252 can also be elastically deformed.

Preferably, the elastic stoppers 250 are provided on both ends of the first guide portion 40 in the embodiments shown in FIGS. 2 and 4, while the elastic stoppers 250 are provided on both ends of the second guide portion 140 in the embodiments shown in FIGS. 5 and 6. Further, the elastic stoppers 250 are preferably provided on both ends of each of the first and second guide portions 240 and 245 in the embodiment shown in FIG. 7.

Hereinafter, the operation of the optical pickup guiding structure for the optical disk drive according to the present invention described above will be described in detail.

First, in the embodiment shown in FIG. 2, the optical pickup 34 moves in such a manner that the first support portion 37 of the pickup body 35 is movably supported on the first guide portion 40 integrally provided in the pickup base 30. The second support portion 38 of the pickup body 35 is movably supported on the guide shaft 46 provided in the second guide portion 45 of the pickup base 30.

Thus, when power needed to move the optical pickup 34 is transferred through the feed guide, the first and second support portions 37 and 38 provided at both the ends of the optical pickup 34 are guided along the first and second guide portions 40 and 45, respectively.

At this time, the movement of the first support portion 37 is guided while the guide rib 41r of the first guide portion 40 is inserted in the guide channel 37c of the first support portion 37, and the movement of the second support portion 38 is supported and guided on the guide shaft 46 while the guide shaft 46 passes through the second support portion 38.

Next, in the embodiment shown in FIG. 5, the first support portion 137 is movably supported on the first guide portion 145 and the second support portion 138 is movably supported in the second guide portion 140, so that the movement of the optical pickup 134 is guided.

That is, when the feed guide receives the power for moving the optical pickup 134, the first and second support portions 137 and 138 move while being guided by the first and second guide portions 145 and 140, respectively, so that the optical pickup 134 moves.

Here, the guide shaft 146 of the first guide portion 145 passes through and movably supports the first support portion 137, and the guide rib 139r of the second support portion 138 is movably supported in the guide channel 141c of the second guide portion 140, so that the optical pickup 134 moves.

In the meantime, in the embodiment shown in FIG. 7, the optical pickup 234 moves while both ends of the optical pickup 234 are supported on the first and second molded guide portions 240 and 245. That is, the guide ribs 237r of the first and second support legs 237' and 237" of the first support portion 237 are seated in the guide channels 241c and 242c formed in the first and second guide legs 241 and 242 of the first guide portion 240, so that the first support portion 237 is guided. Also, the guide rib 245r of the second guide portion 245 is seated in the guide channel 238c formed in the second support portion 238 of the optical pickup 234, so that the second support portion 238 is guided.

The elastic stoppers 250 serve to prevent the optical pickup body 235 from being inadvertently detached from the pickup base 230, and simultaneously to absorb impact caused when the optical pickup body 235 collides against the elastic stopper 250 at a rapid speed due to external impact.

According to the optical pickup guiding structure for an optical disk drive of the present invention so configured, the following advantages can be obtained.

First, the present invention employs only one of the conventional guide shafts or a molded structure integrally formed on the pickup base without using the guide shafts as the configuration for movably supporting both the ends of the optical pickup. Thus, there are advantages in that the number of parts of the optical disk drive is minimized, it is easy to manage the parts, and the assembling workability is improved.

In addition, the optical disk drive is configured such that the relatively small number of parts is employed, and particularly, the number of the parts for movably supporting the optical pickup is minimized. Thus, the accumulation of assembly tolerances is minimized, and thus, the precise movement of the optical pickup can be made.

The scope of the present invention is not limited to the embodiments described and illustrated above but is defined by the appended claims. It will be apparent that those skilled in the art can make various modifications and changes thereto within the scope of the invention defined by the claims. Therefore, the true scope of the present invention should be defined by the technical spirit of the appended claims.

For example, the first and second support portions and the first and second guide portions may be interchanged with each other, i.e. the positions of the guide channels and the guide ribs may be changed each other. The configuration of the guide portions may be employed in a variety of combinations.

In addition, the configuration of the guide channels and ribs with semicircular and almost circular cross section may be combined in various manners with the configuration of the guide portions.

What is claimed is:

1. An optical pickup guiding structure for an optical disk drive, comprising:
a pickup base with a pickup window formed therein; and
an optical pickup provided in the pickup window and having at least one end movably supported by a molded structure integrally formed on the pickup base, wherein the end of the optical pickup and the molded structure movably supporting the end of the optical pickup are formed with a guide channel and a guide rib, respectively, which are complementary to each other, thereby guiding the optical pickup, wherein both ends of a pickup body of the optical pickup are provided with first and second support portions, and first and second molded guide portions that support the first and second support portions are provided along both ends of the pickup window of the pickup base, and wherein the first support portion includes first and second support legs which are different from each other in their levels, and the first guide portion corresponding to the first support portion includes first and second guide legs which are different from each other in their levels in such a manner that the guide legs correspond to the support legs, respectively.

2. The structure as claimed in claim 1, wherein an end of a pickup body of the optical pickup is formed with a first support portion that is movably supported by a first molded guide portion formed on the pickup base, and the other end of the pickup body is provided with a second support portion through which a guide shaft of a second guide portion provided on the pickup base passes and which movably supports the pickup body.

3. The structure as claimed in claim 2, wherein the first support portion in contact with the first guide portion is formed to be wider than the second support portion in contact with the second guide portion.

4. The structure as claimed in claim 2, wherein at least one end of the molded guide portion is provided with an elastically deformable stopper, thereby preventing the optical pickup from being inadvertently detached from the pickup base.

5. The structure as claimed in claim 1, wherein an end of a pickup body of the optical pickup is formed with a first support portion that is movably supported by a first guide portion including a guide shaft provided on the pickup base, and the other end of the pickup body is formed with a second support portion that is movably supported by a second molded guide portion formed on the pickup base.

6. The structure as claimed in claim 5, wherein the first support portion in contact with the first guide portion is formed to be wider than the second support portion in contact with the second guide portion.

7. The structure as claimed in claim 5, wherein at least one end of the molded guide portion is provided with an elastically deformable stopper, thereby preventing the optical pickup from being inadvertently detached from the pickup base.

8. The structure as claimed in claim 1, wherein the first support portion in contact with the first guide portion is formed to be wider than the second support portion in contact with the second guide portion.

9. The structure as claimed in claim 1, wherein at least one end of the molded guide portion is provided with an elastically deformable stopper, thereby preventing the optical pickup from being inadvertently detached from the pickup base.

\* \* \* \* \*